3,226,440
BETA-LOWERALKOXY-TRIFLUOROMETHYL-PHENETHYLAMINES

Melville Sahyun, 102 E. Pueblo St., Santa Barbara, John A. Faust, Solvang, and Nikolaus R. Hansl, Santa Barbara, Calif.; said Faust and said Hansl assignors to said Sahyun
No Drawing. Filed June 7, 1963, Ser. No. 286,165
11 Claims. (Cl. 260—570.6)

This invention relates to novel tertiary amines more particularly to beta - lower - alkoxy - trifluoromethyl-phenethyl-tertiaryamines and to processes for making and using such compositions.

The composition aspect of this invention resides in the concept of chemical compounds having the molecular structure beta - lower - alkoxy-trifluoromethyl-phenethyl-tertiaryamine.

The process of use aspect of this invention resides in the concept of administering a compound of this class in a pharmaceutically acceptable form to mammalian animals to effect a reduction in appetite.

The process of making aspect of this invention resides in the concept of making beta-lower-alkoxy-trifluoromethyl-phenethyl-tertiaryamines by a process which includes the steps of reacting a trifluoromethylphenyl magnesium Grignard reagent with an alpha,beta-dihalo-di-lower-alkyl ether and reacting the thus produced beta-halo-alpha-trifluoromethylphenyl-di-lower-alkyl ether with a secondary amine.

The compounds of this invention are tranquilizers and anorexigenic agents, particularly in mammalian animals, and can be administered for prolonged periods of time without producing undesirable side effects as determined by standard pharmacological and clinical evaluation. They do not exhibit CNS stimulant effects, a definite and unusual advantage for compounds having appetite depressant activity, and little if any evidence of sedation, catalepsy, ptosis or tremor often associated with phenothiazines. They are useful as psychotherapeutic agents. They possess anti-emetic and anti-convulsant activity.

As used herein the terms "lower-alkyl," "lower-alkoxy" and "lower-alkylene" refer, respectively, to alkyl, and alkoxy and alkylene radicals, containing from one to eight carbon atoms, preferably less than five carbon atoms, which can be straight-chain or branched. Representative alkyl radicals are methyl, ethyl, propyl, isopropyl, n-butyl and sec-butyl, amyl, isoamyl, hexyl, heptyl and octyl. Representative lower-alkoxy radicals are methoxy, ethoxy, propoxy, isopropoxy, n-butoxy, and sec-butoxy. Representative lower-alkylene radicals are methylene, ethylene, propylene, isopropylene, butylene and isobutylene, amylene, hexylene, heptylene, and octylene which can provide the methylene bridge on any available carbon atom thereof.

The term "phenethylamine" when used herein encompasses both those beta-lower-alkoxy-trifluoromethylphenethylamines unsubstituted in the alpha position and those substituted thereat by a lower-alkyl group, i.e., compounds represented by the formula

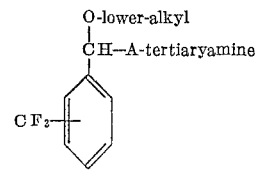

wherein A represents a methylene bridge containing one to eight carbon atoms joining the lower-alkoxy group bearing carbon atom and the amine nitrogen atom of the tertiaryamino group.

The compounds of this invention encompass both the free base form of the amines and the conventional derivatives thereof, e.g., acid addition salts and quaternary ammonium halide salts thereof.

The novel compounds of this invention can be prepared by converting a trifluoromethyl substituted phenyl bromide to the corresponding Grignard reagent. In one alternative route, the reaction of the Grignard reagent with a lower-alkanoic acid anhydride gives a trifluoromethylphenyl lower-alkyl ketone in which the lower-alkyl group corresponds to the alkylene group present in the corresponding compound of the invention. This ketone is then brominated to the corresponding 2-bromoketone. This bromoketone is then reduced to the corresponding secondary alcohol, e.g., with aluminum isopropoxide and the bromine atom is then displaced by reaction with a secondary amine or the bromine atom can be first displaced by reaction of the bromoketone with a secondary amine, preferably a N-(lower-alkyl) benzylamine and the ketone then reduced to the corresponding alcohol, e.g., with lithium aluminum hydride. Treatment with thionyl chloride converts the amino alcohol to the corresponding amine chloride which when reacted with a lower-alkanol and a suitable base or with a metal lower-alkoxide produced the compounds of this invention.

In a second alternative route, the magnesium Grignard reagent is then reacted with an alpha, beta-dihalo-lower-alkyl ether to form a beta-lower-alkoxy-trifluoromethyl-phenethyl halide. Displacement of the halogen atom by reaction with a secondary amine produces the compounds of this invention.

These reactions can be illustrated by the following formulae:

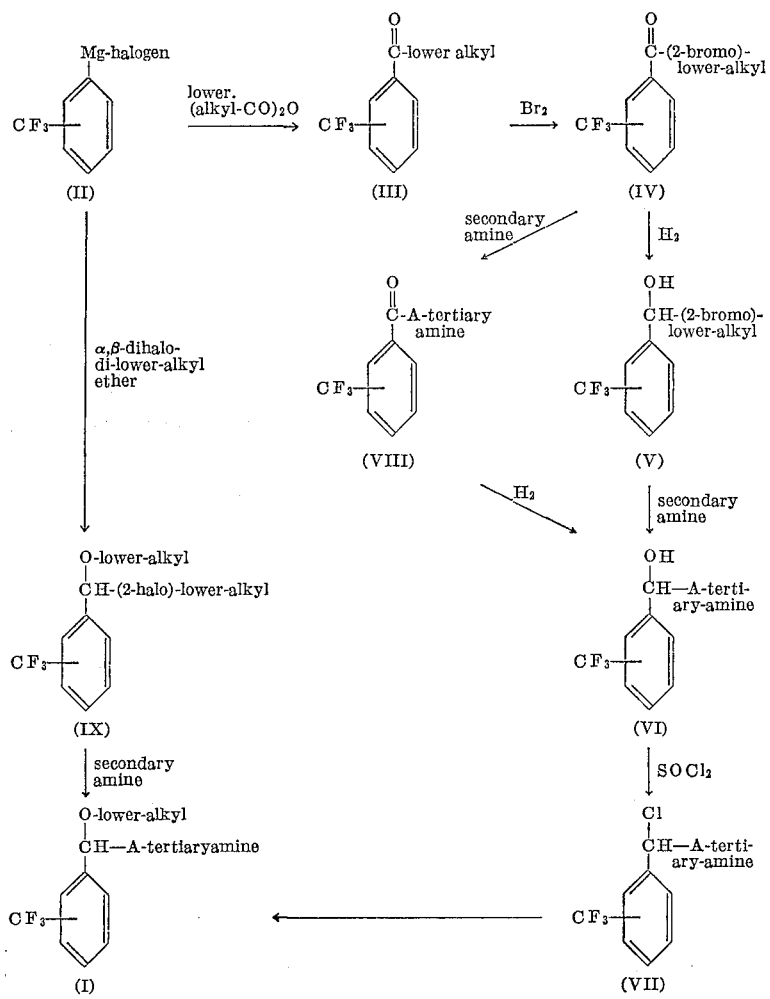

wherein A has the value given above.

The amino group forming the tertiary amine group can be, e.g., dialkylamino, preferably di-lower-alkylamino, especially dimethylamino and dethylamino, cyclic amino, e.g., pyrrolidino, 2-methyl and 3-methylpyrrolidino, piperidino, 2-, 3-, and 4-methylpiperidino, morpholino, di-beta-hydroxyethyl - amino, beta - hydroxyethyl-methylamino, beta-hydroxyethyl-ethylamino, beta-hydroxyethyl-benzyl-amino, benzyl-lower-alkylamino, especially benzyl-methyl-amino, and dibenzylamino wherein the benzyl group is unsubstituted or substituted with a non-interfering group in the 2, 3, 4 or alpha position, e.g., methyl or other lower-alkyl, methoxy or other lower-alkoxy, chloro or other halo, nitro, phenyl, sulfato.

Preferred among the compounds of this invention are those wherein the trifluoromethyl group is in the 3-position, the N-benzyl-N-lower-alkyl-amino compounds, especially the N-benzyl-N-methylamino compounds, the beta-methoxy and beta-ethoxy compounds and the compounds where the methylene bridge contains one or two carbon atoms, i.e., the alpha-unsubstituted and alpha-methyl-phenethyl compounds, and those having combinations of these preferred groups, e.g., N-lower-alkyl-N-benzyl-beta-lower-alkoxy - 3 - thrifluoromethylphenethyl-amine, N-methyl - N - benzyl-beta-lower-alkoxy-trifluoromethylphenethylamine, N-lower-alkyl - N - benzyl-beta-methoxy-trifluoromethylphenethylamine, etc. The 3-trifluoromethyl compounds of this invention have higher therapeutic ratios than the corresponding 2- and 4-trifluoromethyl compounds. The N-benzyl-N-lower-alkyl compounds have substantially better properties than the corresponding N-benzyl secondary amines, the N-lower-alkyl secondary amines and the N,N-di-lower-alkylamines.

The compounds of this invention can bear additional, non-interfering groups, especially on the benzene rings of the molecule, e.g., lower-alkyl, aryl, alkaryl, halo, hydroxy, nitro and such compounds are the equivalent of the corresponding compounds without such additional groups.

Racemic mixtures are obtained as the carbon atom which bears the ether substituent and which is attached to the benzene ring is asymmetric. Also, when a carbon atom in the methylene chain is asymmetric, a further racemate mixture is possible. Racemate pairs can be separated by fractional crystallization of an acid addition salt and each d and l isomer can be separated from the racemate in the conventional manner.

As stated above, the compounds of this invention comprise the acid addition salts. When the tangible embodiments of the invention are employed for their pharmacological effect, they ordinarily will be used in the form of their non-toxic acid addition salts, i.e., pharmaceutically acceptable salts. However, any acid addition salt comes within the scope of this invention as they are all useful, e.g., for purifying the free base or for separating racemate mixtures.

Suitable non-toxic, i.e.,pharmaceutically acceptable, acid addition salts are those formed from mineral acids, e.g., hydrochloric acid, hydrobromic acid, hydroiodic acid, nitric acid, phosphoric acid and sulfuric acid, and organic acids, e.g., acetic acid, citric acid, tartaric acid, lactic acid, and the like, which provide the hydrochloride, hydrobromide, hydroiodide, nitrate, phosphate or acid phosphate, sulfate or bisulfate, acetate, citrate or acid citrate, tartrate or bitartrate, and lactate salts, respectively.

The compounds of his invention can be administered orally, subcutaneously and intraperitoneally in the usual pharmaceutical forms, e.g., admixed with pharmaceutical excipients in the form of tablets, capsules, suppositories, and in liquid emulsions, solutions and suspensions. The selected compound generally should be present in a concentration which will provide at least about 1 mg. per unit dosage, i.e., per tablet, capsule and teaspoonful. An oral dose of about 0.1 mg./kg. or more up to about 5–25 mg./kg. in a suitable vehicle to be given in divided doses to the higher mammals and about 10 to 100 times this dosage to laboratory test animals.

The following preparations and examples are illustrative of the compounds of this invention and of the processes by which they can be prepared but are not to be construed as limiting.

PREPARATION 1.—BETA-METHOXY-3-TRIFLUOROMETHYL-PHENETHYL BROMIDE

To a stirred solution of the Grignard reagent prepared from 124 grams (0.5 mole) of 3-bromo-alpha,alpha,alpha-trifluorotoluene and 14 grams (0.57 mole) of magnesium in 500 milliliters of anhydrous ether was added an ether solution of 109 grams (0.5 mole) of alpha,beta-dibromoethyl methyl ether. The homogenous reaction mixture was allowed to remain overnight at 25 degrees and was then refluxed for 6 hours. The mixture was poured into iced dilute hydrochloric acid. The ether layer was separated, washed, dried and distilled. The yield of beta-methoxy-3-trifluoromethyl - phenethyl bromide was 125 grams (80 percent), B.P. 82–87° C./1.7 mm.; 119–120° C./20 mm.

PREPARATION 2.—BETA-ETHOXY-3-TRIFLUOROMETHYL-PHENETHYL BROMIDE

The reaction of 0.3 mole of alpha,beta-dibromoethyl ethyl ether with 0.3 mole of 3-trifluoromethyl-phenyl magnesium bromide according to the method of Preparation 1 gave on distillation 60 grams (67 percent) of beta-ethoxy-3-trifluoromethyl-phenethyl bromide, B.P. 88–90° C./0.2 mm.

Following the procedure of Preparation 1, beta-methoxy-4-trifluoromethyl-phenethyl bromide and other beta-lower-alkoxy-4- trifluoromethyl-phenethyl bromides are prepared by the reaction of 4-trifluoromethylphenethyl magnesium bromide with alpha,beta-dibromoethyl ethyl ether and other alpha-beta-dibromoethyl lower-alkyl ethers. The corresponding beta-methoxy-2-trifluoromethylphenethyl bromide and other beta-lower-alkoxy-2-trifluoromethyl-phenethyl bromides are similarly prepared using 2-trifluoromethyl-phenyl magnesium bromide. The alpha-alkyl-beta-lower-alkoxy-2-, 3- and 4-trifluoromethyl-phenethyl bromides are prepared by employing the appropriate alpha-beta-dihalo-lower-alkyl lower-alkyl ether.

Example 1.—N-benzyl-N-methyl-beta-methoxy-3-trifluoromethyl-phenethylamine

A mixture of 13.4 grams (0.047 mole) of beta-methoxy-3-trifluoromethyl-phenethyl bromide and 14.5 grams (0.12 mole) of benzylmethylamine was heated at 110° C. for 6 hours. The mixture, which consisted of two layers, was poured into approximately 900 ml. of dilute hydrochloric acid and the neutral material was removed by ether extraction. The aqueous solution was rendered alkaline and extracted with ether. The ether solution was washed, dried and distilled to give 8.7 grams (57 percent) of the free base of N-benzyl-N-methyl-beta-methoxy-3-trifluoromethyl-phenethylamine, B.P. 126–128° C./0.5 mm.

*Analysis.*—Calculated for $C_{18}H_{20}F_3NO$: Neut. Equiv., 323. Found: Neut. Equiv., 327.

The hydrochloride was prepared from the base and ethereal hydrogen chloride and recrystallized from isopropyl alcohol-ether and from acetone-ether to give crystals of the pure hydrochloride melting at 153–154° C.

*Analysis.*—Calculated for $C_{18}H_{20}F_3NO \cdot HCl$: N, 3.89; Cl⁻, 9.85. Found: N, 3.95; Cl⁻, 9.86.

Example 2.—N-benzyl-N-methyl-beta-ethoxy-3-trifluoromethyl-phenethylamine

Alkylation of benzylmethylamine with beta-ethoxy-beta-3-trifluoromethyl-phenethyl bromide according to the procedure of Example 1 gave the free base of N-benzyl-N-methyl-beta-ethoxy - 3 - trifluoromethyl - phenethylamine, B.P. 130–132° C./0.2 mm.

*Analysis.*—Calculated: N, 4.15; Neut. Equiv., 337. Found: N, 4.30; Neut. Equiv., 335.

Example 3.—N,N-diethyl-beta-ethoxy-3-trifluoromethyl-phenethylamine

The alkylation of diethylamine with beta-ethoxy-3-trifluoromethylphenethyl bromide according to the procedure of Example 1 yielded 3.7 grams (33 percent) of the free base of N,N-diethyl-beta-ethoxy-3-trifluoromethyl-phenethylamine, B.P. 86–88° C./0.6 mm.

*Analysis.*—Calculated: Neut Equiv., 287. Found: Neut. Equiv., 282.

The hydrochloride was obtained from the free base and ethereal HCl. Crystallization from acetone-ether, treatment with charcoal and four recrystallizations from acetone-ether yielded the pure hydrochloride as white crystals, M.P. 134–135° C.

*Analysis.*—Calculated: N, 4.54; Cl⁻, 10.96. Found: N, 4.37; Cl⁻, 10.89.

Example 4.—N-(2-hydroxyethyl)-beta-ethoxy-3-trifluoromethyl-phenethylamine

Alkylation of ethanolamine with beta-ethoxy-3-trifluoromethylphenethyl bromide according to procedure of Example 1 yielded 7.9 grams (71 percent) of N-(2-hydroxyethyl) - beta-ethoxy-3-trifluoromethyl - phenethylamine as the free base, B.P. 134–135° C./0.2 mm.

*Analysis.*—Calculated: N, 5.05. Found: N, 5.14.

Alkylating this compound with benzyl chloride, methyl bromide and other lower-alkyl bromides, ethylene oxide or ethylene chlorohydrin produces the corresponding N-benzyl-, N-methyl- and other N-lower-alkyl-, and N-2-hydroxyethyl substituted N-2-hydroxyethyl-beta-ethoxy-3-trifluoromethyl-phenethylamines.

Example 5.—N-benzyl-N-methyl-beta-methoxy-2-trifluoromethyl-phenethylamine

The reaction of N-benzyl-N-methylamine and beta-methoxy-2-trifluoromethyl-phenethyl bromide according to the procedure of Example 1 yielded the free base of N-benzyl - N - methyl - beta - methoxy - 2 - trifluoromethyl-phenethylamine, B.P. 120–122° C./0.1 mm.

*Analysis.*—Calculated: N, 4.33. Found: N, 4.43.

The hydrochloride of this compound, prepared according to the procedure of Example 1, on recrystallization from isopropyl alcohol-ether melted at 166–168° C.

*Analysis.*—Calculated: Cl⁻, 9.85. Found: Cl⁻, 9.62.

Example 6.—N-benzyl-N-methyl-beta-methoxy-4-trifluoromethyl-phenethylamine

Following the procedure of Example 1, the reaction of N-benzyl-N-methylamine and beta-methoxy - 4 - trifluoromethyl-phenethyl bromide yielded the free base of N-benzyl - N - methyl - beta - methoxy - 4 - trifluoromethyl-phenethylamine, B.P. 123–126° C./0.1 mm.

*Analysis.*—Calculated: N, 4.33; Neut. Equiv., 323. Found: N, 4.54; Neut. Equiv., 326.

The hydrochloride of this compound, on recrystallization from isopropyl alcohol-ether, melted at 157–159° C.

*Analysis.*—Calculated: Cl⁻, 9.85. Found Cl⁻, 9.55.

Example 7.—N-(o-chlorobenzyl)-N-methyl-beta-methoxy-3-trifluoromethyl-phenethylamine The free base of this compound was prepared according to the procedure of Example 1 by the reaction of N-

(o-chlorobenzyl)-N-methylamine and beta-methoxy-3-trifluoromethyl-phenethyl bromide, B.P. 135–136° C. 0.3 mm.

*Analysis.*—Calculated: N, 3.91; Neut. Equiv., 358. Found: N, 3.99; Neut. Equiv., 356.

*Example 8.—N-benzyl-N-ethyl-beta-methoxy-3-trifluoromethyl-phenethylamine*

The free base of this compound was obtained according to the procedure of Example 1 by the reaction of N-benzyl - N - ethylamine and beta-methoxy - 3 - trifluoromethyl-phenethyl bromide, B.P. 125–127° C./0.2 mm.

*Analysis.*—Calculated: N, 4.16; Neut. Equiv., 336. Found: N, 4.32; Neut. Equiv., 331.

*Example 9.—N-benzyl-bis(beta-methoxy-3-trifluoromethyl-phenethyl)-amine*

The free base of N-benzyl-beta-methoxy-3-trifluoromethyl-phenethylamine, B.P. 135–137° C./0.3 mm., was prepared according to the procedure of Example 1 by the reaction of benzylamine and beta-methoxy-3-trifluoromethyl-phenethyl bromide. The corresponding hydrochloride melts at 165–167° C. Following the procedure of Example 1, the reaction of the free base of N-benzyl-beta-methoxy-3-trifluoromethyl-phenethylamine and beta-methoxy-3-trifluoromethyl-phenethyl bromide gave N-benzyl-bis(beta - methoxy - 3 - trifluoromethyl - phenethyl)-amine, B.P. 170–173° C./0.2 mm.

*Analysis.*—Calculated: N. 2.74. Found: N. 2.98.

Following the procedure of Example 1, but substituting other secondary amines for the benzylmethylamine, e.g., pyrrolidine, piperidine, morpholine, N-propyl-N-benzylamine, N-hydroxyethyl-N-benzylamine, dibenzylamine, dihydroxyethyl-amine, there is produced the corresponding beta-methoxy-3-trifluoromethyl-phenethyl-pyrrolidine, piperidine, morpholine, N - propyl - N - benzylamine, N-hydroxyethyl-N-benzylamine, dibenzylamine and di-hydroxyethyl-amine, respectively, both as their free bases and as their hydrochlorides.

What is claimed is:
1. A compound of the formula

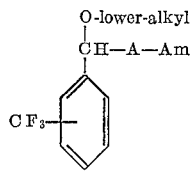

wherein A is alkylene of one to eight carbon atoms forming a methylene bridge and Am is selected from the group consisting of di-lower-alkylamino, pyrrolidino, 2-methyl and 3-methylpyrrolidino, piperidino, 2-, 3- and 4-methylpiperidino, morpholino, di-beta-hydroxyethyl-amino, beta-hydroxyethyl-methylamino, beta-hydroxylethyl-ethylamino, beta-hydroxyethyl-benzylamino, benzyl-lower-alkylamino and dibenzylamino, corresponding compounds bearing on the benzyl group at one of the 2, 3, 4 and alpha positions a substituent from the group consisting of lower-alkyl, lower-alkoxy, halo, nitro, phenyl and sulfato, and corresponding compounds bearing an additional group on the —$CF_3$ substituted benzene ring selected from the group consisting of lower-alkyl, halo, hydroxy and nitro.

2. A compound according to claim 1 wherein the —$CF_3$ group is at the 3-position of the benzene ring.

3. N - lower - alkyl - N - benzyl - beta - lower - alkoxy-trifluoromethyl-phenethylamine.

4. N - lower - alkyl - N - benzyl - beta - lower - alkoxy-3-trifluoromethyl-phenethylamine.

5. N - methyl - N - benzyl - beta - lower - alkoxy - trifluoromethyl-phenethylamine.

6. N - lower - alkyl - N - benzyl - beta - methoxy - trifluoromethyl-phenethylamine.

7. The hydrochloride of N-benzyl-N-methyl-beta-methoxy-3-trifluoromethyl-phenethylamine.

8. The hydrochloride of N-benzyl-N-methyl-beta-methoxy-2-trifluoromethyl-phenethylamine.

9. The hydrochloride of N-benzyl-N-methyl-beta-methoxy-4-trifluoromethyl-phenethylamine.

10. The hydrochloride of N,N-diethyl-beta-ethoxy-3-trifluoromethyl-phenethylamine.

11. The hydrochloride of N-benzyl-beta-methoxy-3-trifluoromethyl-phenethylamine.

References Cited by the Examiner
UNITED STATES PATENTS

| | | | |
|---|---|---|---|
| 2,789,138 | 4/1957 | Heinzelman et al. | 260—570.9 |
| 3,044,932 | 7/1962 | Tazelaar et al. | 260—570.9 XR |
| 3,106,578 | 10/1963 | Kaiser et al. | 260—570.5 |

OTHER REFERENCES

Beck et al.: "Jour. Org. Chem.," vol. 16, pp. 1434–41 (1951).

Gunn et al.: "Jour. Physiol.," vol. 95, pp. 485–500 (1939).

Kaye et al.: "Jour. Amer. Chem. Soc.," vol. 73, pp. 4893–95 (1951).

Steinberg et al.: "Jour. Org. Chem.," vol. 13, pp. 413–20 (1948).

To-Day's Drugs, "British Medical Journal," No. 5247, p. 306 (1961).

Yale "Jour. of Med. and Pharm. Chem.," vol. 1, No. 2, pp. 121–33 (1959).

CHARLES B. PARKER, *Primary Examiner.*

IRVING MARCUS, *Examiner.*

ROBERT V. HINES, *Assistant Examiner.*